(12) United States Patent
Akkary et al.

(10) Patent No.: US 7,487,337 B2
(45) Date of Patent: Feb. 3, 2009

(54) BACK-END RENAMING IN A CONTINUAL FLOW PROCESSOR PIPELINE

(75) Inventors: Haitham Akkary, Portland, OR (US); Ravi Rajwar, Portland, OR (US); Srikanth T. Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 10/953,761

(22) Filed: Sep. 30, 2004

(65) Prior Publication Data

US 2006/0095738 A1 May 4, 2006

(51) Int. Cl.
G06F 9/30 (2006.01)
G06F 15/00 (2006.01)

(52) U.S. Cl. ...................... 712/217; 712/219

(58) Field of Classification Search ................. 712/219, 712/217
See application file for complete search history.

(56) References Cited

U.S. PATENT DOCUMENTS

| | | | |
|---|---|---|---|
| 5,490,255 A * | 2/1996 | Rawlinson et al. | 712/219 |
| 5,524,262 A * | 6/1996 | Colwell et al. | 712/23 |
| 5,659,721 A * | 8/1997 | Shen et al. | 712/228 |
| 5,673,408 A * | 9/1997 | Shebanow et al. | 712/216 |
| 5,740,414 A * | 4/1998 | Tovey et al. | 712/233 |
| 5,974,524 A * | 10/1999 | Cheong et al. | 712/23 |
| 6,108,771 A * | 8/2000 | Gaertner et al. | 712/217 |
| 6,205,541 B1 * | 3/2001 | Tran et al. | 712/217 |
| 6,425,072 B1 * | 7/2002 | Meier et al. | 712/218 |
| 6,505,293 B1 * | 1/2003 | Jourdan et al. | 712/217 |
| 6,625,723 B1 * | 9/2003 | Jourday et al. | 712/217 |
| 7,143,267 B2 * | 11/2006 | Fluhr et al. | 712/207 |
| 2002/0156997 A1 * | 10/2002 | Farrell et al. | 712/217 |
| 2003/0005260 A1 * | 1/2003 | Garg et al. | 712/23 |
| 2003/0135713 A1 * | 7/2003 | Rychlik et al. | 712/217 |
| 2003/0200421 A1 * | 10/2003 | Crook et al. | 712/215 |
| 2004/0030867 A1 * | 2/2004 | Arnold et al. | 712/217 |
| 2004/0215892 A1 * | 10/2004 | Fluhr et al. | 711/137 |
| 2006/0090061 A1 * | 4/2006 | Akkary et al. | 712/214 |
| 2006/0090063 A1 * | 4/2006 | Theis | 712/239 |

OTHER PUBLICATIONS

Tong Li, Jinson Koppanalil, Alvin R. Lebeck, Jaidev Patwardhan, and Eric Rotenberg. "A large, fast instruction window for tolerating cache misses", Technical Report CS-2002-03, Department of Computer Science, Duke University, Mar. 2002. Pertinent pp. 1-21.*

(Continued)

Primary Examiner—Eddie P Chan
Assistant Examiner—Idriss N Alrobaye
(74) Attorney, Agent, or Firm—Kenyon & Kenyon LLP

(57) ABSTRACT

Embodiments of the present invention relate to a system and method for comparatively increasing processor throughput and relieving pressure on the processor's scheduler and register file by diverting instructions dependent on long-latency operations from a flow of the processor pipeline and re-introducing the instructions into the flow when the long-latency operations are completed. In this way, the instructions do not tie up resources and overall instruction throughput in the pipeline is comparatively increased. Before the instructions are diverted from the pipeline, they may undergo a conventional process to map logical registers of the instructions to physical registers. Before the instructions are re-introduced into the pipeline, the physical registers mapped according to the conventional process may be re-mapped to other physical registers, thereby efficiently preserving correct program sequence information.

19 Claims, 4 Drawing Sheets

OTHER PUBLICATIONS

"Computer Architecture: A Quantitative Approach, Third Edition" (The Morgan Kaufmann Series in Computer Architecture and Design) by John L. Hennessy, David A. Patterson. Publisher: Morgan Kaufmann; 3 edition (May 15, 2002). Pertinent pp. 237-239.*

"Scalable Register Renaming via the Quack Register File (2000)" Bryan Black, John Paul Shen. Pertinent pp. 1-24.*

"Exploiting value locality in physical register files"; Balakrishnan, S.; Sohi, G.S.; Microarchitecture, 2003. MICRO-36. Proceedings. 36th Annual IEEE/ACM International Symposium on 2003 pp. 265-276.*

"Dynamic Instruction Reuse"; Sodani, A.; Sohi, G.S.; Computer Architecture, 1997. Conference Proceedings. The 24th Annual International Symposium on Jun. 2-4, 1997 pp. 194-205.*

"A novel renaming scheme to exploit value temporal locality throughphysical register reuse and unification"; Jourdan, S. Ronen, R. Bekerman, M. Shomar, B. Yoaz, A.; This paper appears in: Microarchitecture, 1998. MICRO-31. Proceedings. 31st Annual ACM/IEEE International Symposium on Publication Date: Nov. 30-Dec. 2, 1998 On pp. 216-225.*

U.S. Appl. No. 10/953,762, Haitham Akkary et al.

* cited by examiner

US 7,487,337 B2

BACK-END RENAMING IN A CONTINUAL FLOW PROCESSOR PIPELINE

BACKGROUND

Microprocessors are increasingly being called on to support multiple cores on a single chip. To keep design efforts and costs down and to adapt to future applications, designers often try to design multiple core microprocessors that can meet the needs of an entire product range, from mobile laptops to high-end servers. This design goal presents a difficult dilemma to processor designers: maintaining the single-thread performance important for microprocessors in laptop and desktop computers while at the same time providing the system throughput important for microprocessors in servers. Traditionally, designers have tried to meet the goal of high single-thread performance using chips with single, large, complex cores. On the other hand, designers have tried to meet the goal of high system throughput by providing multiple, comparatively smaller, simpler cores on a single chip. Because, however, designers are faced with limitations on chip size and power consumption, providing both high single-thread performance and high system throughput on the same chip at the same time presents significant challenges. More specifically, a single chip will not accommodate many large cores, and small cores traditionally do not provide high single-thread performance.

One factor which strongly affects throughput is the need to execute instructions dependent on long-latency operations, such as the servicing of cache misses. Instructions in a processor may await execution in a logic structure known as a "scheduler." In the scheduler, instructions with destination registers allocated wait for their source operands to become available, whereupon the instructions can leave the scheduler, execute and retire.

Like any structure in a processor, the scheduler is subject to area constraints and accordingly has a finite number of entries. Instructions dependent on the servicing of a cache miss may have to wait hundreds of cycles until the miss is serviced. While they wait, their scheduler entries are kept allocated and thus unavailable to other instructions. This situation creates pressure on the scheduler and can result in performance loss.

Similarly, pressure is created on the register file because the instructions waiting in the scheduler keep their destination registers allocated and therefore unavailable to other instructions. This situation can also be detrimental to performance, particularly in view of the fact that the register file may need to sustain thousands of instructions and is typically a power-hungry, cycle-critical, continuously clocked structure.

DETAILED DESCRIPTION

Figure 1:
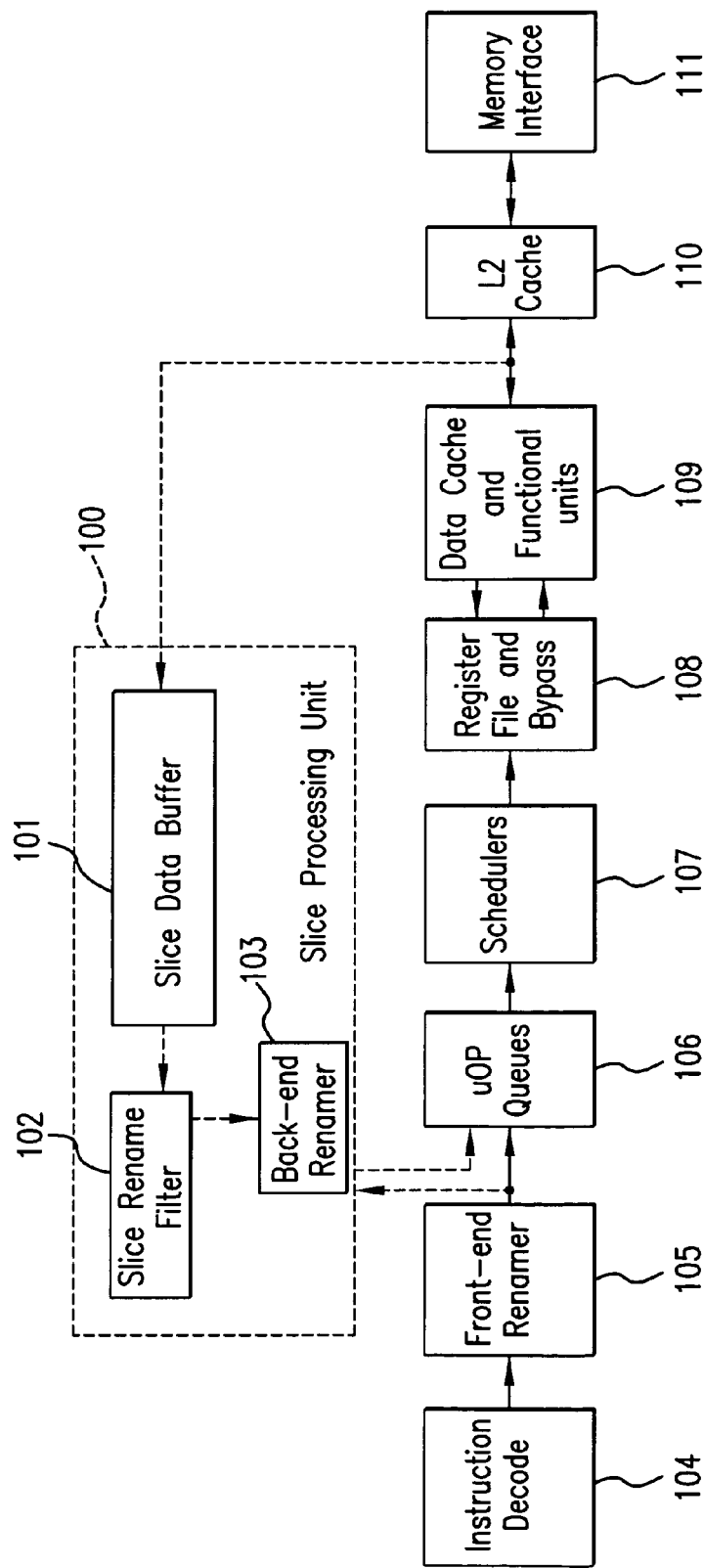
FIG. 1 shows elements of a processor comprising a slice processing unit according to embodiments of the present invention.

Embodiments of the present invention relate to a system and method for comparatively increasing processor throughput and memory latency tolerance, and relieving pressure on the scheduler and on the register file, by diverting instructions dependent on long-latency operations from a processor pipeline flow and re-introducing them into the flow when the long-latency operations are completed. In this way, the instructions do not tie up resources and overall instruction throughput in the pipeline is comparatively increased.

More specifically, embodiments of the present invention relate to identifying instructions dependent on a long-latency operation, referred to herein as "slice" instructions, and moving them from the processor pipeline to a "slice data buffer" along with at least a portion of information needed for the slice instructions to execute. The information may include a logical register to physical register mapping for each instruction, where the mapping is created by a known process often called register "renaming," described in more detail below. This conventional renaming may be performed by logic referred to herein as a "front-end renamer" (as opposed to a "back-end renamer" discussed further on). The scheduler entries and registers allocated to slice instructions may then be reclaimed for use by other instructions. Instructions independent of the long latency operation can use these resources and continue program execution. When the long-latency operation upon which the slice instructions in the slice data buffer depend is completed, the slice instructions may be re-introduced into the pipeline, executed and retired. Embodiments of the present invention thereby effect a non-blocking, continual flow processor pipeline.

Because, however, the slice instructions release the physical registers they had allocated, new physical registers must be allocated and mapped to the slice instructions before the slice instructions are re-introduced into the pipeline. According to embodiments of the present invention, this allocation and mapping (or more precisely, re-mapping) may be performed by a "back-end renamer" which performs renaming of the slice instructions in a way analogous to the way the front-end renamer processed the slice instructions before they were ever identified as slice instructions. In contrast to the conventional renaming performed by the front-end renamer, however, the back-end renamer may perform physical register to physical register mapping instead of logical register to physical register mapping. The physical register to physical register mapping avoids a number of drawbacks associated with prior approaches to implementing continual flow processor pipelines, as described in more detail further on. (While the terminology "physical register to physical register mapping" is used herein for conciseness, it should be understood that, more precisely, the physical register identifier, not the physical register itself, of the previous logical to physical mapping is allocated a new physical register and mapped to that new physical register's identifier. Thus, the physical register identifier of the previous mapping is treated in a manner analogous to the way the front-end renamer treats a logical register identifier, as described in more detail below.)

Also discussed in the following are mechanisms for merging slice instructions back into the normal instruction flow in the pipeline, in view of considerations relating to check-pointed registers and "liveout" registers when back-end renaming as described above is performed. Further, a method for determining a minimum number of reserved physical registers, visible only to the back-end renamer, required to prevent deadlocks in a processor when the processor has both a back-end renamer and a front-end renamer is also described below.

FIG. 1 shows an example of a system according to embodiments of the present invention. The system may comprise a "slice processing unit" 100 according to embodiments of the present invention. The slice processing unit 100 may comprise a slice data buffer 101, a slice rename filter 102, and a back-end renamer 103. Operations associated with these elements are discussed in more detail further on.

The slice processing unit 100 may be associated with a processor pipeline. The pipeline may comprise an instruction decoder 104 to decode instructions, coupled to a front-end renamer 105. As is well known, processors may include logic such as the front-end renamer 105 to allocate physical registers to instructions and map logical registers of the instructions to the physical registers. "Map" as used here means to define or designate a correspondence between (in conceptual terms, a logical register identifier is "renamed" into a physical register identifier). More specifically, for the brief span of its life in a pipeline, an instruction's source and destination operands, when they are specified in term of identifiers of the registers of the processor's set of logical (also, "architectural") registers, are assigned physical registers so that the instruction can actually be carried out in the processor. The physical register set is typically much more numerous than the logical register set and thus multiple different physical registers can be mapped to the same logical register.

The front-end renamer 105 may be coupled to uop ("micro"-operation, i.e., instruction) queues 106 to queue instructions for execution, and the uop queues 106 may be coupled to schedulers 107 to schedule the instructions for execution. The mapping of logical registers to physical registers (referred to hereafter as "the physical register mapping") performed by the front-end renamer 105 may be recorded in a reorder buffer (ROB) (not shown) or in the schedulers 107 for instructions awaiting execution. According to embodiments of the present invention, the physical register mapping may be copied to the slice data buffer 101 for instructions identified as slice instructions, as described in more detail further on.

The schedulers 107 may be coupled to the register file, which includes the processor's physical registers, shown in FIG. 1 with bypass logic in block 108. The register file and bypass logic 108 may interface with data cache and functional units logic 109 that executes the instructions scheduled for execution. An L2 cache 110 may interface with the data cache and functional units logic 109 to provide data retrieved via a memory interface 111 from a memory subsystem (not shown).

As noted earlier, the servicing of a cache miss for a load that misses in the L2 cache may be considered a long-latency operation. Other examples of long latency operations include floating point operations and dependent chains of floating point operations. As instructions are processed by the pipeline, instructions dependent on long latency operations may be classified as slice instructions and be given special handling according to embodiments of the present invention to prevent the slice instructions from blocking or slowing pipeline throughput. A slice instruction may be an independent instruction, such as a load that generates a cache miss, or an instruction that depends on another slice instruction, such as an instruction that reads the register loaded by the load instruction.

When a slice instruction occurs in the pipeline, it may be stored in the slice data buffer 101, in its place in a scheduling order of instructions as determined by schedulers 107. A scheduler typically schedules instructions in data dependence order. The slice instruction may be stored in the slice data buffer with at least a portion of information necessary to execute the instruction. For example, the information may include the value of a source operand if available, and the instruction's physical register mapping.

According to embodiments of the present invention, identification of slice instructions may be performed dynamically by tracking register and memory dependencies of long-latency operations. More specifically, slice instructions may be identified by propagating a slice instruction indicator via physical registers and store queue entries. A store queue is a structure (not shown in FIG. 1) in the processor to hold store instructions queued for writing to memory. Load and store instructions may read or write, respectively, fields in store queue entries. The slice instruction indicator may be a bit, referred to herein as a "Not a Value" (NAV) bit, associated with each physical register and store queue entry. The bit may not be initially set (e.g., it has a value of logic "0"), but be set, (e.g. to logic "1"), when an associated instruction depends on a long-latency operation.

The bit may initially be set for an independent slice instruction and then propagated to instructions directly or indirectly dependent on that independent instruction. More specifically, the NAV bit of the destination register of an independent slice instruction in the scheduler, such as a load that misses the cache, may be set. Subsequent instructions having that destination register as a source may "inherit" the NAV bit, in that the NAV bits in their respective destination registers may also be set. If the source operand of a store instruction has its NAV bit set, the NAV bit of the store queue entry corresponding to the store may be set. Subsequent load instructions either reading from or predicted to forward from that store queue entry may have the NAV bit set in their respective destinations. The instruction entries in the scheduler may also be provided with NAV bits for their source and destination operands corresponding to the NAV bits in the physical register file and store queue entries. The NAV bits in the scheduler entries may be set as corresponding NAV bits in the physical registers and store queue entries are set, to identify the scheduler entries as containing slice instructions. A dependency chain of slice instructions may be formed in the scheduler by the foregoing process.

In the normal course of operations in a pipeline, an instruction may leave the scheduler and be executed when its source registers are ready, that is, contain the values needed for the instruction to execute and yield a valid result. A source register may become ready when, for example, a source instruction has executed and written a value to the register. Such a register is referred to herein as a "completed source register." According to embodiments of the present invention, a source register may be considered ready either when it is a completed source register, or when its NAV bit is set. Thus, a slice instruction can leave the scheduler when any of its source registers is a completed source register, and any source register that is not a completed source register has its NAV bit set. Slice instructions and non-slice instructions can therefore "drain" out of the pipeline in a continual flow, without the delays caused by dependence on long-latency operations, and allowing subsequent instructions to acquire scheduler entries.

Operations performed when a slice instruction leaves the scheduler may include recording, along with the instruction itself, an identifier of the instruction, and the value of any completed source register of the instruction in the slice data buffer. Any completed source register may be marked as read. This allows the completed source register to be reclaimed for use by other instructions. The instruction's physical register mapping may also be recorded in the slice data buffer. A plurality of slice instructions (a "slice") may be recorded in the slice data buffer along with corresponding completed source register values and physical register mappings. In consideration of the foregoing, a slice may be viewed as a self-contained program that can be re-introduced into the pipeline, when the long-latency operation upon which it depends completes, and executed efficiently since the only external input needed for the slice to execute is the data from the load (assuming the long-latency operation is the servicing of a cache miss). Other inputs have been copied to the slice data buffer as the values of completed source registers, or are generated internally to the slice.

Further, as noted earlier, the destination registers of the slice instructions may be released for reclamation and use by other instructions, relieving pressure on the register file.

In embodiments, the slice data buffer may comprise a plurality of entries. Each entry may comprise a plurality of fields corresponding to each slice instruction, including a field for the slice instruction itself and an identifier of the instruction, a field for a completed source register value, and fields for the physical register mappings of source and destination registers of the slice instruction. Slice data buffer entries may be allocated as slice instructions leave the scheduler, and the slice instructions may be stored in the slice data buffer in the order they had in the scheduler, as noted earlier. The slice instructions may be returned to the pipeline, in due course, in the same order. For example, in embodiments the instructions could be reinserted into the pipeline via the uop queues 107, but other arrangements are possible. In embodiments, the slice data buffer may be a high density SRAM (static random access memory) implementing a long-latency, high bandwidth array, similar to an L2 cache.

It may be understood, however, that when they are eventually ready to be executed, the slice instructions must be re-mapped since the registers of their original mappings will likely have been reclaimed and in use by other instructions. It may further be understood that the slice instructions in the slice data buffer are in data flow order, not program order, since they were placed in the slice data buffer in the order they had in the scheduler. Therefore, the logical register names associated with these instructions do not reflect true data dependence and cannot be used for re-issuing and executing the instructions.

Accordingly, embodiments of the present invention implement a novel technique to preserve true data dependence for slice instructions to be re-inserted into the pipeline, as follows. As noted above, embodiments of the present invention include a back-end renamer 103. The back-end renamer 103 maps physical registers to physical registers for slice instructions to be re-inserted into the pipeline. More specifically, the back-end renamer 103 allocates and maps new physical registers to the physical register identifiers originally mapped to the logical registers of the instructions by the front-end renamer 105.

For example, assume that an instruction I1 had, as its destination logical register, logical register L1. Further assume that the front-end renamer 105 mapped L1 to, say, physical register P5 on the initial journey of instruction I1 through the pipeline. Then, assume that I1 turned out to be a slice instruction due to dependence on a long latency operation or another slice instruction, and was accordingly placed in the slice data buffer. When the long latency operation completes and I1 is ready to be re-inserted into the pipeline and executed, the back-end renamer 103 may map P5 to another physical register, say, physical register P12 that is currently free.

The above technique provides at least the two following benefits: (1) the new physical-to-physical mapping retains the correct data dependence information using just data dependence order, without having to maintain full program order, and removes any false WAW (Write After Write), RAW (Read after Write) and WAR (Write After Read) dependencies in a slice; (2) the slice data buffer need not scale with the instruction window size of a processor in order to maintain program order, in contrast to prior art approaches. As noted earlier, the mapping of physical registers to physical registers according to embodiments of the present invention is not known in conventional implementations of continual flow pipelines.

Because, in view of the foregoing, a processor according to embodiments of the present invention may comprise both a front-end renamer and a back-end renamer as described above, the embodiments may further comprise logic to ensure that conflicts or inconsistencies do not arise as a result of operations of the two mapping elements. Such conflicts could arise, for example, with respect to "liveout" registers and checkpointed registers. The following discusses liveout registers in more detail first, and then checkpointed registers are discussed in more detail.

Liveout registers, as is well known, are the logical registers and corresponding physical registers that reflect the current state of a program. More specifically, a liveout register corresponds to the last or most recent instruction of a program to write to a given logical register of a processor's logical instruction set. For example, suppose there is a program sequence where each of instructions I1, I2, I3 and I4 writes (in that order) to logical register L1. Further suppose that physical register, say, P5 was allocated to L1 for I1's write, that physical register, say, P19 was allocated to L1 for I2's write, and that physical register, say, P2 was allocated to L1 for I3's write. Now suppose a "snapshot" of the program state is taken after I3 executes: at the time the snapshot is taken, the liveout register for L1 corresponds to I3 and its value is contained in P2. Instruction I4 will produce the next liveout register for L1. Typically, for the program sequence, there will be other instructions similarly corresponding to the other liveout registers of the processor's logical register set. Thus, more generally, the liveout registers represent the state of a program sequence at any given point in time.

To ensure that correct program logic is maintained, the front-end renamer 105 keeps track of which instructions correspond to the liveout registers, so that when an instruction has a liveout register as a source, the front-end renamer 105 can assign the instruction's source register the correct physical register. For example, if in program 1, instruction I1 produces the liveout register for logical register L1, the front-end renamer 105 must ensure that the source registers of subsequent instructions in program 1 that read L1 are mapped to whatever physical register I1's destination register (the register written to by I1) was mapped to.

Because slice instructions are removed from the normal pipeline flow for a period of time and then re-inserted into the pipeline, measures are needed with respect to liveouts to ensure that slice instructions are correctly merged with the overall instruction stream when they are re-inserted, or errors may result. To understand this, consider the following example. Assume an instruction I1 reads from logical registers L2 and L3 and writes to logical register L1. In other words, L2 and L3 are I1's source registers and L1 is its destination register. Further assume an instruction I2, that follows instruction I1 in program order, reads from logical register L1 (the result produced by I1) and logical register L4, and writes to logical register L5. In other words, L1 and L4 are I2's source registers and L5 is its destination register.

Now, assume that instruction I1 is processed by the front-end renamer 105, and its logical registers are respectively mapped as follows: the destination register L1 to physical register P20, source register L2 to physical register P11, and source register L3 to physical register P4. The physical registers might have been assigned in the foregoing way simply because they happened to be available; no particular significance, in this instance, attaches to the identifiers of the physical registers. On the other hand, when the front-end renamer 105 subsequently processes instruction I2, the front-end renamer must ensure that I2's L1 source register is mapped to physical register P20, because it is P20 that will hold the value that I2 needs to read, i.e., the value written to P20 by I1. In other words, P20 is the physical register corresponding to the liveout for L1. Accordingly, assume the front-end renamer maps, for instruction I2, the source register L1 to physical register P20, source register L4 to, say, physical register P8, and destination register L5 to, say, physical register P17. The latter two mappings may be made, again, simply because these physical registers happen to be available.

Now assume that I1 is a slice instruction, and accordingly is sent to the slice data buffer for some period of time, but that I2 was not included in the slice. Instead, assume I2 occurred in the program order such that the slice containing I1 had already been re-inserted into the pipeline by the time I2 was scheduled. When I1 is ready to be re-inserted into the pipeline, the registers of I1 will be remapped by the back-end renamer 103. However, consider the situation if the back-end renamer 103 does not preserve the original mapping of the front-end renamer 105 for I1's destination register, L1. Say, for example, the back-end renamer mapped physical register P20 to physical register P25 for instruction I1. The front-end renamer 105 will have mapped P20 to I2's L1 source register, but when I1 executes, it will write its result to P25, not P20. Thus, when I2 executes, it will read P20 and get the wrong value. Embodiments of the present invention address this, as explained below.

The discussion turns now to checkpointed physical registers, Checkpointing is a known process in speculative processors. Checkpointing may be performed to preserve the state of the architectural (logical) registers of a given program at a given point, so that the state can be readily recovered if needed. In particular, checkpointing involves reserving the set of physical registers corresponding to the state of the architectural registers of the given program at the given point, until it is determined that the checkpoint is no longer needed. For example, checkpointing may be performed at a low-confidence branch. Along lines discussed above, if a slice instruction writes to a checkpointed physical register, that checkpointed physical register should not be assigned a new physical register by the renamer 103. Instead, that checkpointed physical register must be mapped to the same physical register originally assigned to it by the front-end renamer 105, otherwise the checkpoint would become corrupted/invalid.

In consideration of the foregoing, embodiments of the present invention may comprise mechanisms for merging or re-introducing slice instructions into the pipeline, where the mechanisms take into account liveout registers and checkpointed registers. The mechanisms may include a "slice rename filter" 102 as shown in FIG. 1. The slice rename filter 102 may communicate with the slice data buffer 101 and the back-end renamer 103.

The slice rename filter 102 may further communicate with the front-end renamer 105. As noted earlier, the front-end renamer 105 tracks what instructions are associated with liveout registers and may provide this information, along with the information as to what physical registers are mapped to the liveout registers, to the slice rename filter 102. For example, each time a liveout register is mapped to a physical register by the front-end renamer 105, an identifier of the instruction writing the liveout register, and the liveout register's physical register mapping, may be copied from the front-end renamer 105 to the slice rename filter 102. Identifiers of checkpointed registers may also be recorded in the slice rename filter 102. When a slice instruction that has been waiting in the slice data buffer 101 is ready to be re-inserted into the pipeline, the instruction's identifier may be compared with identifiers in the slice rename filter 102. If the instruction's identifier matches an identifier in the slice rename filter 102, the processing of the instruction by the back-end renamer 103 is skipped. The slice instruction is re-inserted into the pipeline with the mapping originally assigned to it by the front-end renamer, and when it executes it simply writes its result into the liveout or checkpointed register. The foregoing mechanism effectively merges the results of a slice into the liveout physical and/or checkpointed register state, thus allowing new instructions to read the correct inputs through the conventional logical to physical register renaming mechanism.

Figure 2:
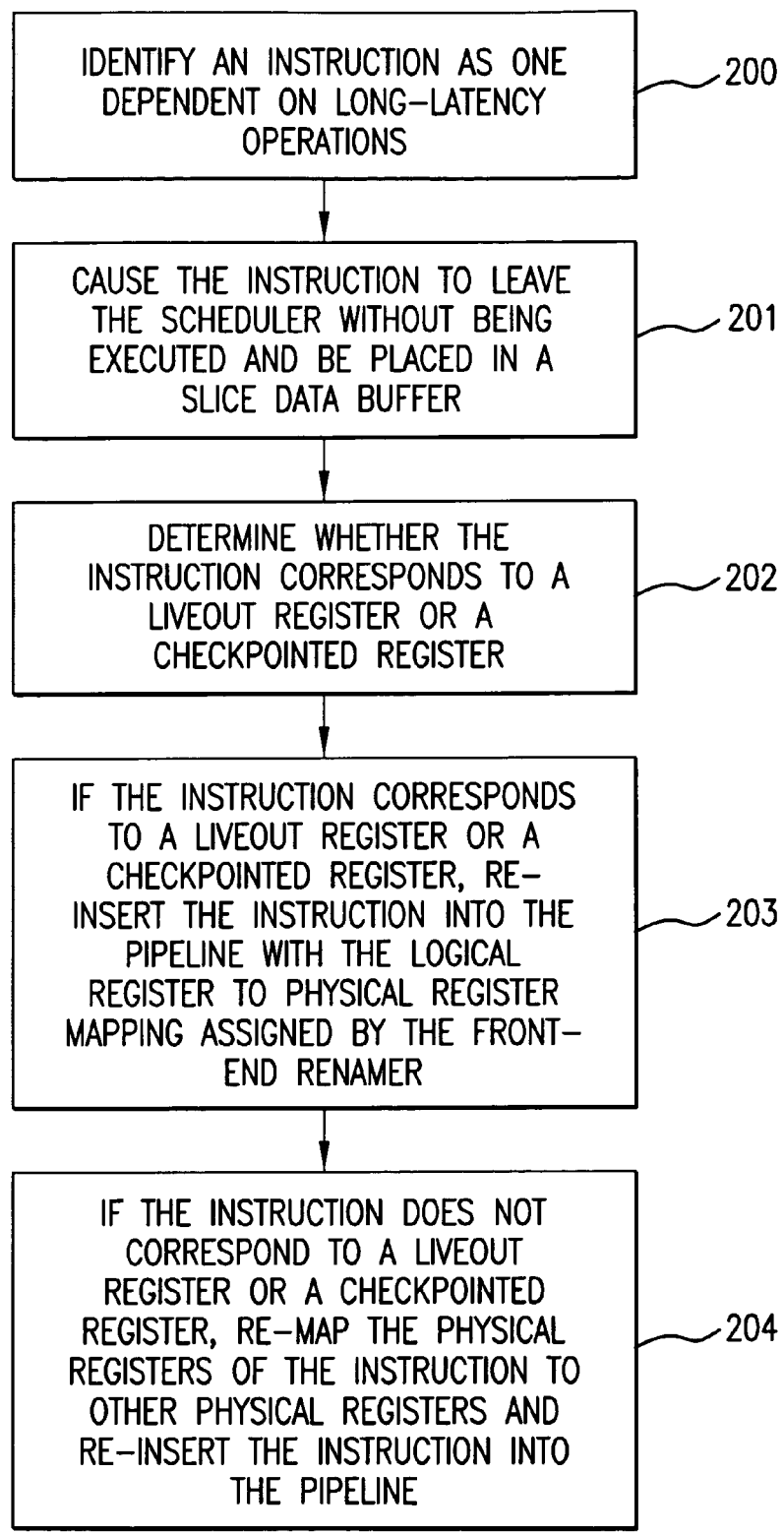
FIG. 2 shows a process flow according to embodiments of the present invention.

In view of the foregoing description, FIG. 2 shows a process flow according to embodiments of the present invention. As shown in block 200, the process may comprise identifying an instruction in a scheduler of a processor pipeline as one dependent on a long-latency operation. For example, the instruction could be a load instruction that generates a cache miss.

As shown in block 201, based on the identification, the instruction may be caused to leave the pipeline without being executed and be placed in a slice data buffer, along with at least a portion of information needed to execute the instruction. The at least a portion of information may include a physical register mapping assigned by a front-end renamer.

After the long-latency operation completes, the instruction may be re-inserted into the pipeline. Before the instruction is re-inserted into the pipeline, it may be determined whether the instruction corresponds to a liveout register or a checkpointed register, as shown in block 202. If the instruction corresponds to a liveout register or a checkpointed register, the instruction may be re-inserted into the pipeline with the logical register to physical register mapping assigned by the front-end renamer, as shown in block 203.

On the other hand, as shown in block 204, if the instruction does not correspond to a liveout register or a checkpointed register, the physical registers mapped to the logical registers of the instruction by the front-end renamer may be mapped to other physical registers by a back-end renamer, and the instruction may be re-inserted into the pipeline with the physical register to physical register mapping assigned by the back-end renamer.

Embodiments of the present invention further relate to determining a minimum number of reserved physical registers, visible only to the back-end renamer, required to prevent deadlocks in a processor when the processor has both a back-end renamer and a front-end renamer as described above. This determination may relate to preventing deadlocks due to checkpointing and liveouts. More specifically, the circumstance could arise that physical registers may be unavailable to be remapped to slice instructions because the physical registers are tied up by checkpoints and liveouts. On the other hand, it may be the case that only when the slice instructions complete can the physical registers tied up by the checkpoints or liveouts be released. This situation can lead to deadlock.

Figure 3:
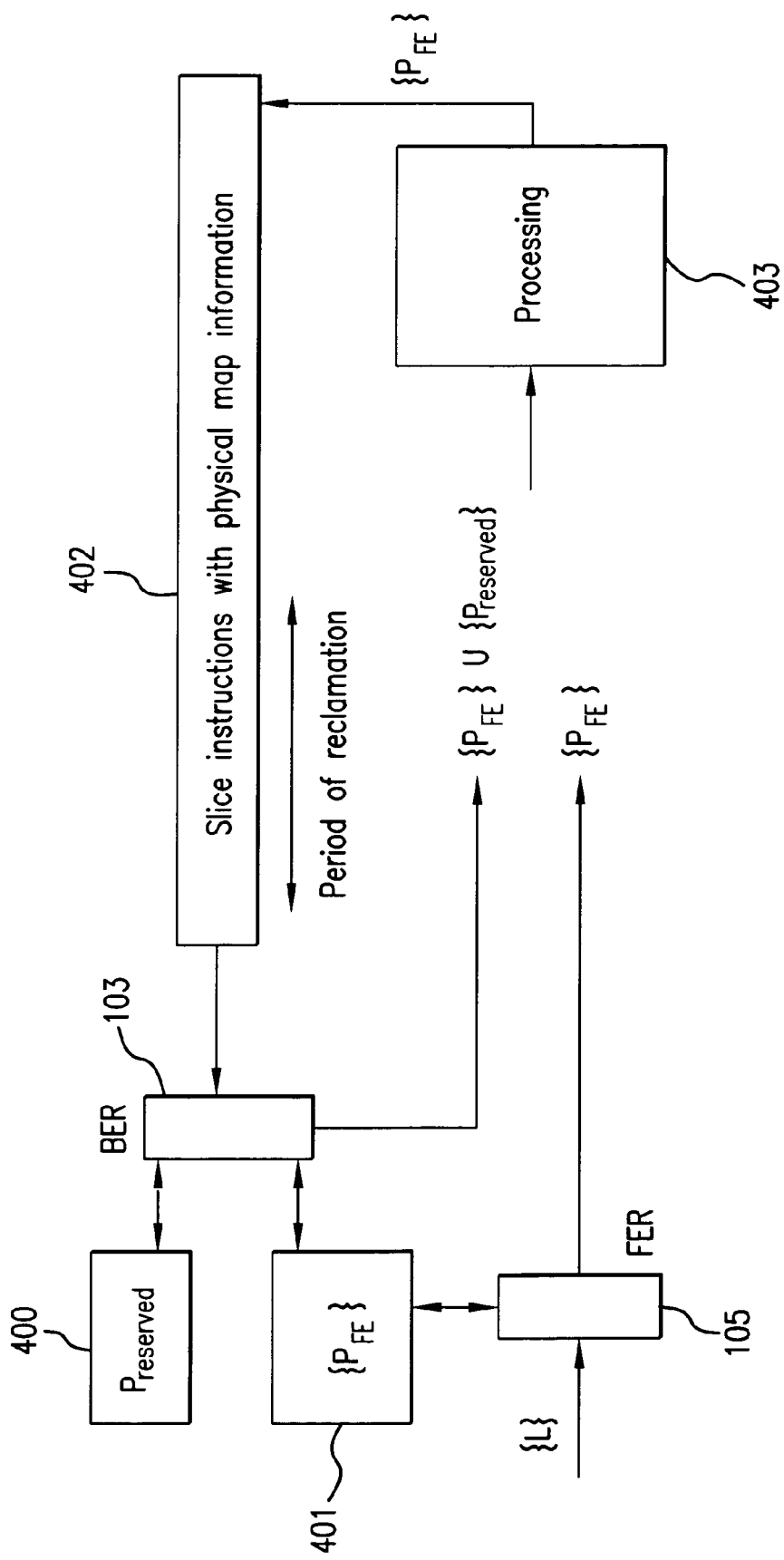
FIG. 3 shows a relationship of processor registers to a "back-end renamer" and a "front-end renamer" according to embodiments of the present invention.

Accordingly, the back-end renamer could have a range of physical registers available for mapping that is over and above the range available to the front-end renamer 105, to guarantee that a physical register is always available for mapping by the back-end renamer. This is illustrated in FIG. 3. As shown in FIG. 3, according to embodiments of the present invention, the back-end renamer 103 may have available to it for mapping to physical registers of slice instructions 402 a set of reserved physical register identifiers 400 (denoted $\{P_{reserved}\}$), as well as the set of physical register identifiers 401 (denoted $\{P_{FE}\}$) available to the front-end renamer 105 for mapping to the set of logical register identifiers (denoted $\{L\}$) of instructions in general. As further indicated in FIG. 3, the back-end renamer 103 and the front-end renamer 105 may respectively provide mappings taken from the union of the $\{P_{reserved}\}$ and $\{P_{FE}\}$ sets, and from the $\{P_{FE}\}$ set, to the other processing logic 403 of the pipeline. For example, there could be N actual physical registers in a processor; the identifiers of only N-M of these might be made available to the front-end renamer 105 for mapping to instructions (i.e., M of the N identifiers would not be available), while the identifiers of the entire range of N would be available to the back-end renamer 103.

As noted earlier, embodiments of the present invention relate determining the minimum number needed for $\{P_{reserved}\}$. Minimizing $\{P_{reserved}\}$ is desirable, among other reasons, to better utilize silicon area, improve efficiency and lower cost.

It is understood that for a conventional renamer, a physical register is guaranteed to become available for mapping to a new logical destination register after at most L writes, where L is the number of logical registers. This is because after all the logical registers are written, the next write must overwrite one of those logical registers, since no others are available. This means that the physical register previously allocated to the logical register to be overwritten can be released, since its contents are no longer of interest. The released physical register can then be mapped to another logical destination register.

The situation is analogous for the back-end renamer according to embodiments of the present invention, except that the back-end renamer maps from the set of physical register identifiers, not the set of logical register identifiers. Thus, for the back-end renamer, theoretically a physical register is guaranteed to become available for mapping to a new physical destination register after $P_{FE}$ register writes.

However, in light of the preceding discussion, checkpointed and liveout registers are not available for mapping by the back-end renamer. Thus, the back-end renamer is actually only able to map from the set $\{P_{FE}-L-n*L\}$, where n is the number of checkpoints supported by the processor. Therefore, a minimum number needed for $\{P_{reserved}\}$ is $L+n*L+1$.

Again, the above represents a minimum number of physical registers, visible only to the back-end renamer, required to prevent deadlocks in a processor that has both a back-end renamer and a front-end renamer The minimum number may be determined a priori, for example during processor design. It may be understood that since conventional processors do not perform back-end renaming, conventional processors do not include such a set of reserved registers.

Figure 4:
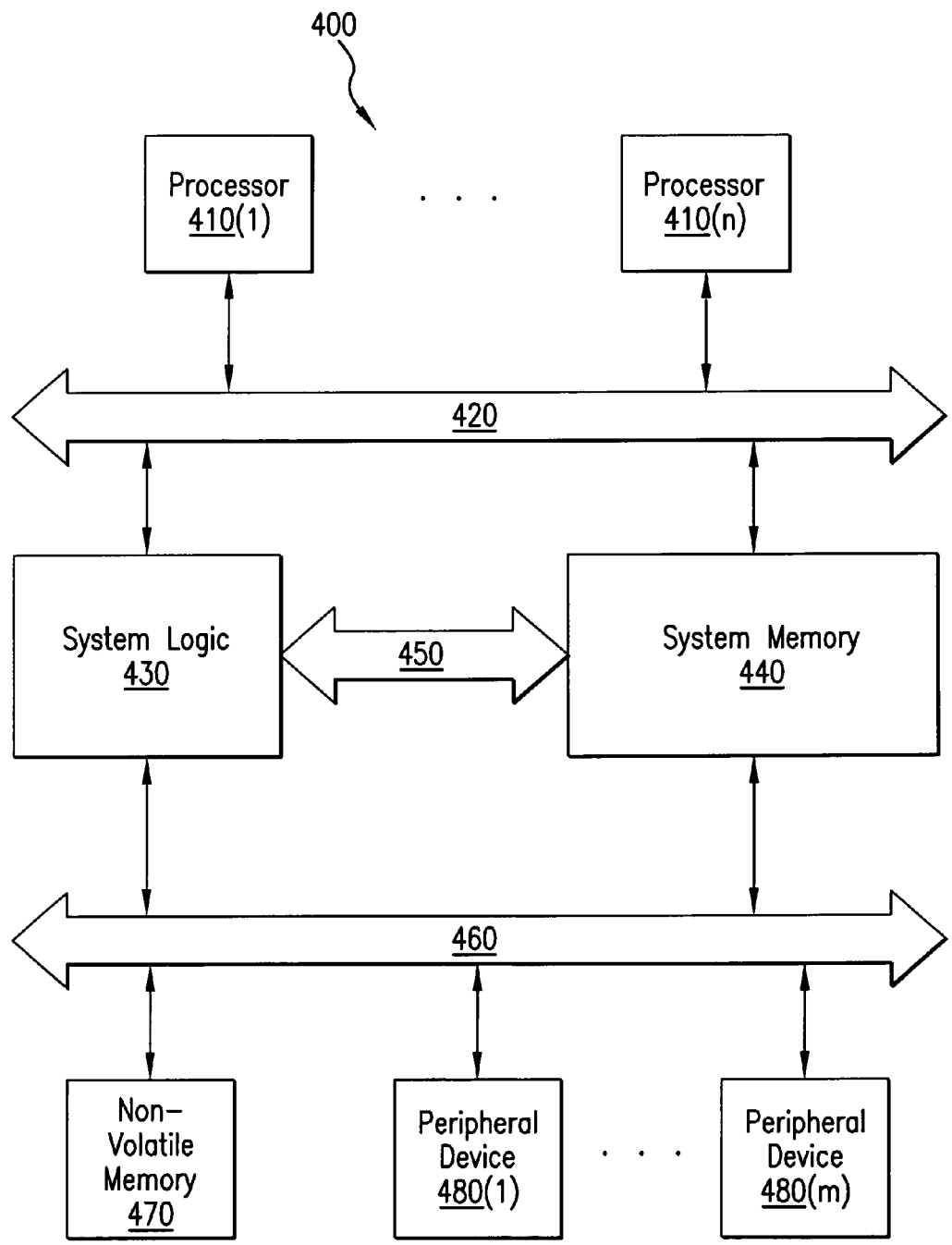
FIG. 4 shows a system comprising a processor according to embodiments of the present invention.

FIG. 4 is a block diagram of a computer system, which may include an architectural state, including one or more processor packages and memory for use in accordance with an embodiment of the present invention. In FIG. 4, a computer system 400 may include one or more processor packages 410(1)-410(n) coupled to a processor bus 420, which may be coupled to a system logic 430. Each of the one or more processor packages 410(1)-410(n) may be N-bit processor packages and may include a decoder (not shown) and one or more N-bit registers (not shown). System logic 430 may be coupled to a system memory 440 through a bus 450 and coupled to a non-volatile memory 470 and one or more peripheral devices 480(1)-480(m) through a peripheral bus 460. Peripheral bus 460 may represent, for example, one or more Peripheral Component Interconnect (PCI) buses, PCI Special Interest Group (SIG) PCI Local Bus Specification, Revision 2.2., published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 470 may be a static memory device such as a read only memory (ROM) or a flash memory. Peripheral devices 480(1)-480(m) may include, for example, a keyboard; a mouse or other pointing devices; mass storage devices such as hard disk drives, compact disc (CD) drives, optical disks, and digital video disc (DVD) drives; displays and the like.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method comprising:
    mapping a logical register to a physical register for an instruction;
    identifying said instruction in a processor pipeline as one dependent on a long-latency operation;
    based on the identification, causing the instruction to be placed in a data storage area, along with the logical register to physical register mapping for the instruction;
    determining whether the instruction has a liveout register as a source or a checkpointed register as a destination; and
    if so, re-inserting the instruction into the pipeline with the logical register to physical register mapping after the long-latency operation completes;
    otherwise, re-mapping the physical register of the mapping to another physical register for said instruction and re-inserting the instruction into the pipeline.

2. The method of claim 1, further comprising executing the instruction.

3. The method of claim 1, wherein the long-latency operation is one performed pursuant to the servicing of a cache miss.

4. A method comprising:
    mapping a logical register to a physical register for an instruction;
    identifying said instruction in a processor pipeline as one dependent on a long-latency operation;
    based on the identification, causing the instruction to be placed in a data storage area, along with the logical register to physical register mapping for the instruction;
    determining whether the instruction corresponds to a liveout register or a checkpointed register; and
    if the instruction corresponds to a liveout register or a checkpointed register, re-inserting the instruction into the pipeline with the logical register to physical register mapping after the long-latency operation completes;
    otherwise, re-mapping the physical register of the mapping to another physical register for said instruction and re-inserting the instruction into the pipeline.

5. The method of claim 4, further comprising executing the instruction.

6. A method comprising:
    (i) performing a logical register to physical register mapping of an instruction in a processor pipeline;

(ii) determining that the instruction depends on a long-latency operation;

(iii) storing the instruction in a data storage area along with the logical register to physical register mapping if the instruction depends on a long-latency operation;

(iv) determining whether the instruction corresponds to a liveout register or a checkpointed register and determining whether the instruction is to be re-inserted into the pipeline with the logical register to physical register mapping of (i); and (v) based on (iv), performing one of re-inserting the instruction into the pipeline with the logical register to physical register mapping, and remapping a physical register of the mapping to another physical register and re-inserting the instruction into the pipeline.

7. The method of claim 6, wherein if it is determined in (iv) that the destination register of the instruction is a liveout register, the instruction is re-inserted into the pipeline with the logical register to physical register mapping.

8. The method of claim 6, wherein if it is determined in (iv) that the destination register of the instruction is a checkpointed register, the instruction is re-inserted into the pipeline with the logical register to physical register mapping.

9. The method of claim 6, wherein if it is determined in (iv) that the destination register of the instruction is not a liveout register or a checkpointed register, a physical register of the mapping is remapped to another physical register.

10. A processor comprising:
   logic to map a logical register to a physical register for a plurality of instructions;
   a data storage area to store ones of said instructions identified as dependent on long-latency operations, the data storage area to further store, for each instruction, a logical register to physical register mapping of the instruction; and
   mapping logic coupled to the data storage area to re-map the physical register of one said instruction identified as dependent on long-latency operations to another physical register and if the instruction corresponds to a liveout register or a checkpointed register, to re-insert the instruction into the pipeline with the logical register to physical register mapping after the long-latency operation completes; otherwise, to re-map the physical register of the mapping to another physical register for said instruction and re-insert the instruction into the pipeline.

11. The processor of claim 10, further comprising filter logic coupled to the data storage area and to the mapping logic, the filter logic to store identifiers of instructions for which the mapping logic is not to perform the physical register to physical register mapping.

12. A processor comprising:
   first mapping logic to perform logical register to physical register mapping for instructions in a pipeline of the processor;
   a data storage area to store instructions identified as dependent on long-latency operations, the data storage area to further store, for each instruction, the logical register to physical register mapping of the instruction, where the mapping was performed by the first mapping logic; and
   second mapping logic to perform a re-mapping of the mapping performed by the first mapping logic if instructions are identified as dependent on long-latency operations, where the re-mapping maps the physical registers of said logical register to physical register mapping performed by the first mapping logic to physical registers and if the instruction corresponds to a liveout register or a checkpointed register, to re-insert the instruction into the pipeline with the logical register to physical register mapping after the long-latency operation completes; otherwise, to re-map the physical register of the mapping to another physical register for said instruction and re-insert the instruction into the pipeline.

13. The processor of claim 12, further comprising filter logic to store identifiers of instructions for which the second mapping logic is not to perform the re-mapping.

14. A system comprising:
   a memory to store instructions; and
   a processor including:
      logic to map a logical register to a physical register for a plurality of instructions;
      a data storage area to store instructions identified as dependent on long-latency operations, the data storage area to further store, for each instruction, a logical register to physical register mapping of the instruction; and
      mapping logic coupled to the data storage area to re-map the physical register to another physical register for the instructions identified as long-latency operations and if the instruction corresponds to a liveout register or a checkpointed register, to re-insert the instruction into the pipeline with the logical register to physical register mapping after the long-latency operation completes; otherwise, to re-map the physical register of the mapping to another physical register for said instruction and re-insert the instruction into the pipeline.

15. The system of claim 14, wherein the processor further includes filter logic coupled to the data storage area and to the mapping logic, the filter logic to store identifiers of instructions for which the mapping logic is not to perform the physical register to physical register mapping.

16. A system comprising:
   a memory to store instructions; and
   a processor including:
      first mapping logic to perform logical register to physical register mapping for instructions in a pipeline of the processor;
      a data storage area to store instructions identified as dependent on long-latency operations, the data storage area to further store, for each instruction, the logical register to physical register mapping of the instruction, where the mapping was performed by the first mapping logic; and
      second mapping logic to re-map the mapping performed by the first mapping logic for instructions identified as dependent on long-latency operations, where the re-mapping maps the physical registers of the logical register to physical register mapping performed by the first mapping logic to different physical registers and if the instruction corresponds to a liveout register or a checkpointed register, to re-insert the instruction into the pipeline with the logical register to physical register mapping after the long-latency operation completes; otherwise to re-map the physical register of the mapping to another physical register for said instruction and re-insert the instruction into the pipeline.

17. The system of claim 16, wherein the processor further includes filter logic to store identifiers of instructions for which the second mapping logic is not to perform the re-mapping.

18. The system of claim 16, wherein the processor further includes a set of reserved physical registers visible only to the second mapping logic.

19. The system of claim 18, wherein a number of the reserved physical registers is a minimum number required to prevent deadlock in the processor.

* * * * *